US012267431B2

(12) United States Patent
Sutherland et al.

(10) Patent No.: US 12,267,431 B2
(45) Date of Patent: *Apr. 1, 2025

(54) APPLICATION OF INTERACTION MODELING FOR LAMBDA TRIGGERING OF AUTHORIZATION

(71) Applicant: Truist Bank, Charlotte, NC (US)

(72) Inventors: Peter Eric Sutherland, Matthews, NC (US); Laurence Henry Lipsmeyer, Chapel Hill, NC (US); Nelson Joseph Erb, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 273 days.

This patent is subject to a terminal disclaimer.

(21) Appl. No.: 17/662,941

(22) Filed: May 11, 2022

(65) Prior Publication Data

US 2023/0370271 A1 Nov. 16, 2023

(51) Int. Cl.
*H04L 9/32* (2006.01)
*G10L 15/22* (2006.01)
*H04L 9/40* (2022.01)

(52) U.S. Cl.
CPC ............ *H04L 9/3228* (2013.01); *G10L 15/22* (2013.01); *H04L 63/105* (2013.01); *G10L 2015/221* (2013.01); *G10L 2015/223* (2013.01)

(58) Field of Classification Search
CPC ..... H04L 63/18; H04L 63/105; H04L 9/0894; H04L 9/3226; H04L 9/3228; G06F 21/32; G10L 15/22; G10L 2015/221; G10L 2015/223

See application file for complete search history.

(56) References Cited

U.S. PATENT DOCUMENTS

| 9,007,473 | B1 | | 4/2015 | Worley, III | |
|---|---|---|---|---|---|
| 9,147,054 | B1 | * | 9/2015 | Beal | G06F 21/32 |
| 10,554,657 | B1 | * | 2/2020 | Siddiqui | H04L 63/0861 |
| 10,708,269 | B1 | * | 7/2020 | Yancey | G06F 21/604 |
| 11,657,815 | B2 | * | 5/2023 | Tran | G10L 25/84 |
| | | | | | 704/233 |
| 2016/0277439 | A1 | * | 9/2016 | Rotter | H04L 63/0861 |
| 2018/0014189 | A1 | * | 1/2018 | Ellison | H04L 63/083 |
| 2018/0060599 | A1 | * | 3/2018 | Horling | G06F 21/31 |
| 2019/0189132 | A1 | * | 6/2019 | Viswanathan | G10L 15/22 |
| 2020/0160856 | A1 | * | 5/2020 | Kline | G06F 3/167 |

(Continued)

OTHER PUBLICATIONS

Wang, Lillin; Schairer, David Roy; and Spates, Mark IV, "On-demand Multi-factor Authentication for Automated Assistant Interactions", Technical Disclosure Commons, (Nov. 26, 2018) (Year: 2018).

*Primary Examiner* — Michael Pyzocha
(74) *Attorney, Agent, or Firm* — Michael A. Springs, Esq.; Shumaker, Loop & Kendrick, LLP; Patrick B. Horne

(57) ABSTRACT

A conversational interface receives a conversational request for an action which requires step-up authentication; responds to the user using conversational AI with a warning that an additional step is required; transmits the authorization intent and the spoken submission to a virtual private cloud (VPC), and in response to confirmation of the spoken submission, authenticates the user, thereby authorizing the requested action; and receives a confirmation of validation of the passphrase and that the action is being or will be performed.

17 Claims, 6 Drawing Sheets

(56) References Cited

U.S. PATENT DOCUMENTS

| | | |
|---|---|---|
| 2020/0193993 A1 | 6/2020 | Levy |
| 2021/0081923 A1 | 3/2021 | Rafferty |
| 2021/0173916 A1 | 6/2021 | Ortiz |
| 2021/0211421 A1 | 7/2021 | Shetty |
| 2021/0304766 A1 | 9/2021 | Gupta |

* cited by examiner

400

NATO Phonetic Alphabet

| A | Alpha   | N | November |
|---|---------|---|----------|
| B | Bravo   | O | Oscar    |
| C | Charlie | P | Papa     |
| D | Delta   | Q | Quebec   |
| E | Echo    | R | Romeo    |
| F | Foxtrot | S | Sierra   |
| G | Golf    | T | Tango    |
| H | Hotel   | U | Uniform  |
| I | India   | V | Victor   |
| J | Juliet  | W | Whiskey  |
| K | Kilo    | X | X-ray    |
| L | Lima    | Y | Yankee   |
| M | Mike    | Z | Zulu     |

FIG. 4

APPLICATION OF INTERACTION MODELING FOR LAMBDA TRIGGERING OF AUTHORIZATION

FIELD

This invention relates generally to the field conversational interfaces, and more particularly embodiments of the invention relate to step-up authentication for conversational interfaces.

BACKGROUND

Presently, conversational ambient computing is largely or completely unauthenticated. The only limitation on permissions for conversational ambient computing or conversational interfaces is physical access. So called voice-print technologies are not currently mature enough to be useable for authentication with any conversational interface. Certain conversational interface platforms allow for users to establish a PIN for authorization of certain interactions, but the clear downside to use of a PIN is that a spoken PIN can easily be overhead and compromised. A one-time password can provide some level of security but present one-time passwords are typically alphanumeric (e.g., 1234ABCD). Spoken alphanumeric strings do not provide consistent results for voice interfaces. Therefore, an alternate means of determining if the user is authorized to request a particular action is needed.

BRIEF SUMMARY

Embodiments of the present invention address the above needs and/or achieve other advantages by providing apparatuses and methods for step-up authentication for conversational interfaces using spoken passphrases. According to embodiments of the invention, a conversational interface for step-up authentication using spoken passphrases, the system comprising: at least one processor; a communication interface communicatively coupled to the at least one processor; and a memory device storing executable code that, when executed, causes the processor to: receive a conversational request for an action which requires step-up authentication; respond to the user using conversational artificial intelligence (AI) with a warning that an additional step is required; wherein a passphrase service of a datacenter transmits, over a communication channel separate from the conversational interface and to the user, a secret passphrase generated using a spoken passphrase dictionary; receive a spoken submission from the user in response to the warning; generate an authorization intent using an interaction model; transmit the authorization intent and the spoken submission to a virtual private cloud (VPC), wherein the authorization intent and spoken submission is transmitted to the datacenter using one or more application programming interfaces (APIs) for validation of the spoken passphrase; wherein the passphrase service of the datacenter confirms validity of the received spoken submission by comparing the spoken submission to the passphrase; and in response to confirmation of the spoken submission, authenticates the user, thereby authorizing the requested action; and receive a confirmation of validation of the passphrase and that the action is being or will be performed.

In some embodiments, the passphrase service of the datacenter accesses a spoken passphrase dictionary of words; and generates the secret passphrase by randomly selecting a plurality of words from the spoken passphrase dictionary.

In some embodiments, transmission by the passphrase service of the datacenter of the secret passphrase over the communication channel separate from the conversational interface and receiving of the spoken submission occur asynchronously.

In some such embodiments, asynchronous occurrence refers to up to one hour of time passing between transmission and receiving.

In some embodiments, the communication channel is configured to communicate using at least one selected from the group consisting of SMS, text, email, and app push notification.

In some embodiments, the passphrase is a one-use passphrase that will be invalid if used more than once.

In some embodiments, the passphrase expires a predetermined period of time after its transmission to the user.

In some embodiments, the spoken passphrase dictionary comprises words selected because of their easy-to-pronounce and easy-to-distinguish characteristics.

In some such embodiments, none of the words of the spoken passphrase dictionary overlap significantly in sound.

In some embodiments, the spoken passphrase dictionary words are subject to removal from the dictionary in the event they are identified as causing confusion with other words.

In some embodiments, the passphrase comprises at least three words randomly selected from the spoken passphrase dictionary.

According to embodiments of the invention, a method for step-up authentication for using spoken passphrases, the method performed by a conversational interface includes receiving a conversational request for an action which requires step-up authentication; responding to the user using conversational artificial intelligence (AI) with a warning that an additional step is required; wherein a passphrase service of a datacenter transmits, over a communication channel separate from the conversational interface and to the user, a secret passphrase generated using a spoken passphrase dictionary; receiving a spoken submission from the user in response to the warning; generating an authorization intent using an interaction model; transmitting the authorization intent and the spoken submission to a virtual private cloud (VPC), wherein the authorization intent and spoken submission is transmitted to the datacenter using one or more datacenter application programming interfaces (APIs) for validation of the spoken passphrase; wherein the passphrase service of the datacenter confirms validity of the received spoken submission by comparing the spoken submission to the passphrase; and in response to confirmation of the spoken submission, authenticates the user, thereby authorizing the requested action; and receiving a confirmation of validation of the passphrase and that the action is being or will be performed.

In some embodiments, the passphrase service of the datacenter accesses a spoken passphrase dictionary of words; and generates the secret passphrase by randomly selecting a plurality of words from the spoken passphrase dictionary.

In some embodiments, transmission by the passphrase service of the datacenter of the secret passphrase over the communication channel separate from the conversational interface and receiving of the spoken submission occur asynchronously.

In some such embodiments, asynchronous occurrence refers to up to one hour of time passing between transmission and receiving.

In some embodiments, the communication channel is configured to communicate using at least one selected from the group consisting of SMS, text, email, and app push notification.

In some embodiments, the passphrase is a one-use passphrase that will be invalid if used more than once.

In some embodiments, the passphrase expires a predetermined period of time after its transmission to the user.

In some embodiments, the spoken passphrase dictionary comprises words selected because of their easy-to-pronounce and easy-to-distinguish characteristics.

According to embodiments of the invention, a conversational interface for step-up authentication using spoken passphrases includes at least one processor; a communication interface communicatively coupled to the at least one processor; and a memory device storing executable code that, when executed, causes the processor to: receive a conversational request for an action which requires step-up authentication of the user; respond to a user using conversational artificial intelligence (AI) with a warning that an additional step is required; wherein a passphrase service of a datacenter transmits, over a communication channel separate from the conversational interface and to the user, a secret passphrase generated using a spoken passphrase dictionary; receive a spoken submission from the user in response to the warning; wherein the user has been validated using basic authentication to the conversational interface, which stores user information in the memory device; generate an authorization intent using an interaction model and at least a portion of the user information; transmit the authorization intent and the spoken submission to a virtual private cloud (VPC), wherein the authorization intent and spoken submission is transmitted to the datacenter using one or more datacenter application programming interfaces (APIs) for validation of the spoken passphrase; wherein the passphrase service of the datacenter confirms validity of the received spoken submission by comparing the spoken submission to the passphrase; and in response to confirmation of the spoken submission, authenticates the user, thereby authorizing requested action; and receive a confirmation of validation of the passphrase and that the action is being or will be performed.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
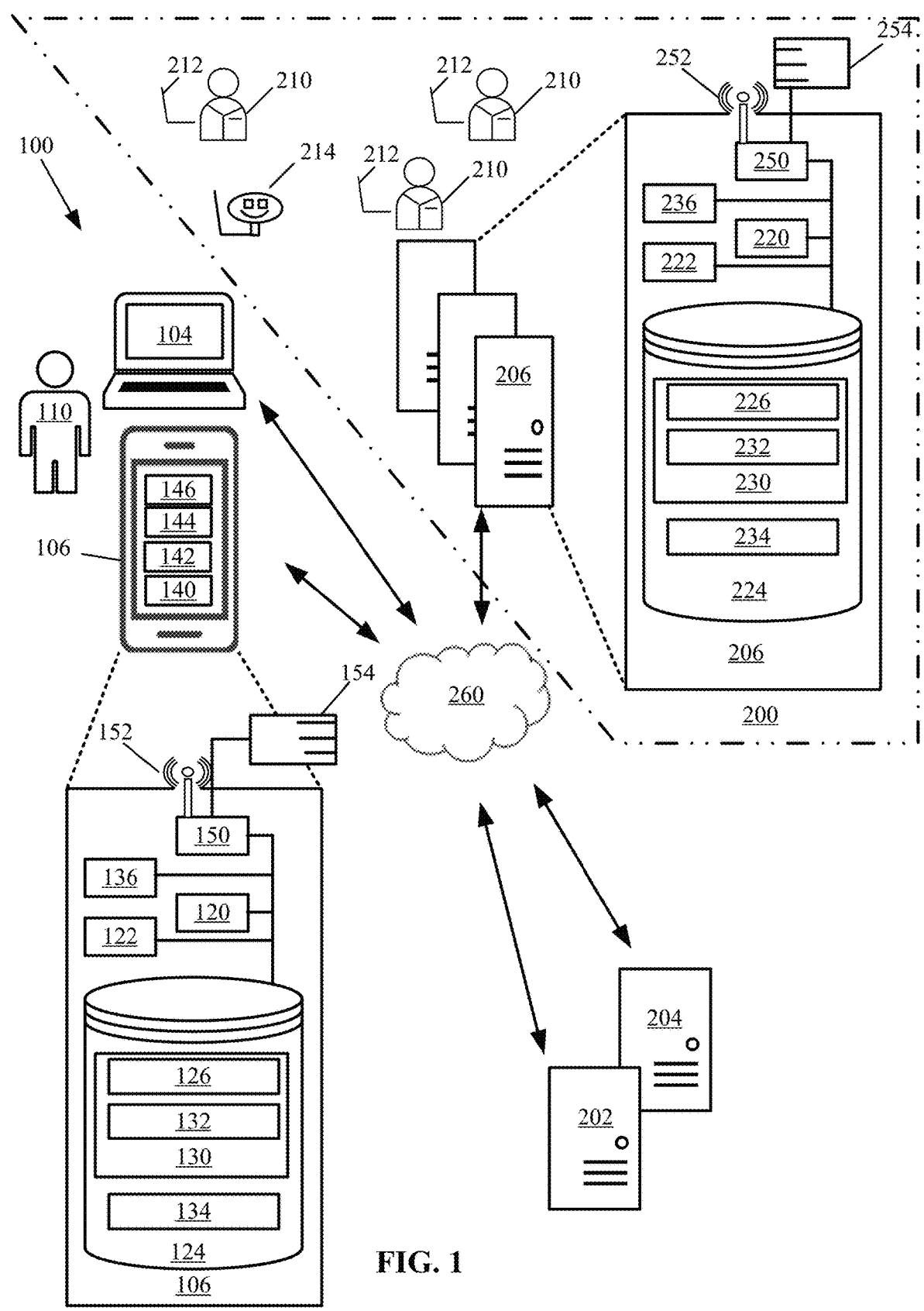
Figure 2:
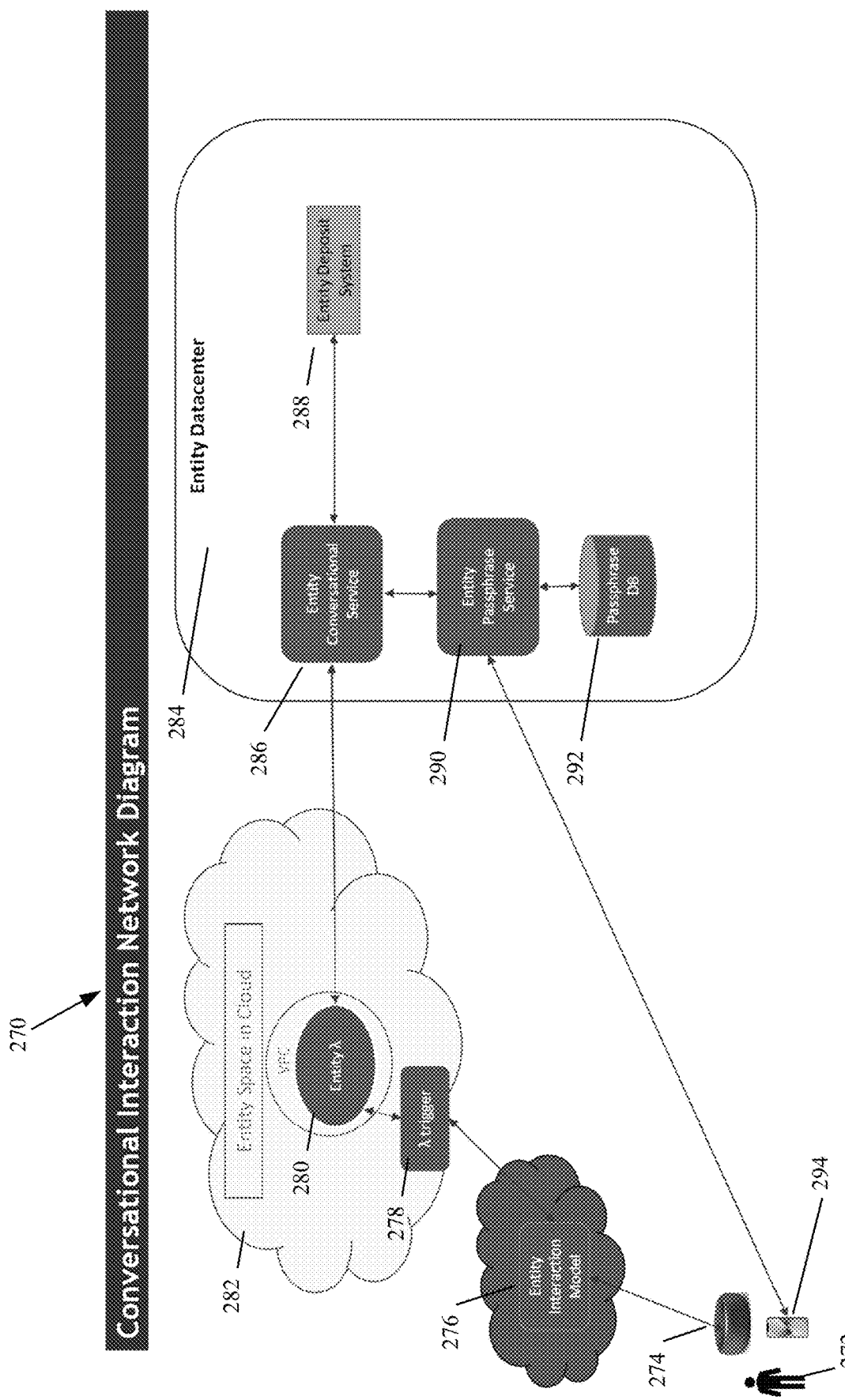
Figure 3:
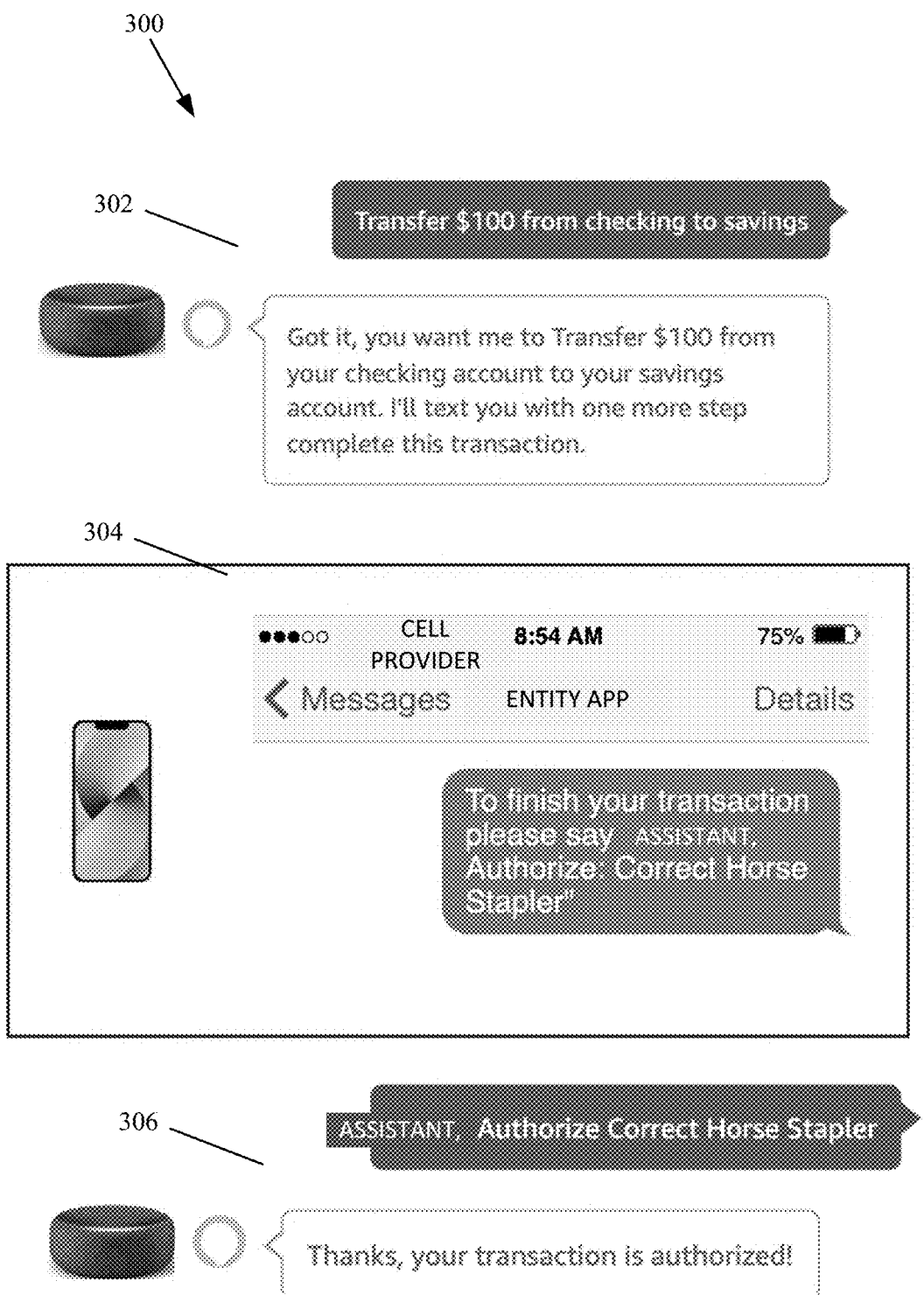
Figure 5:
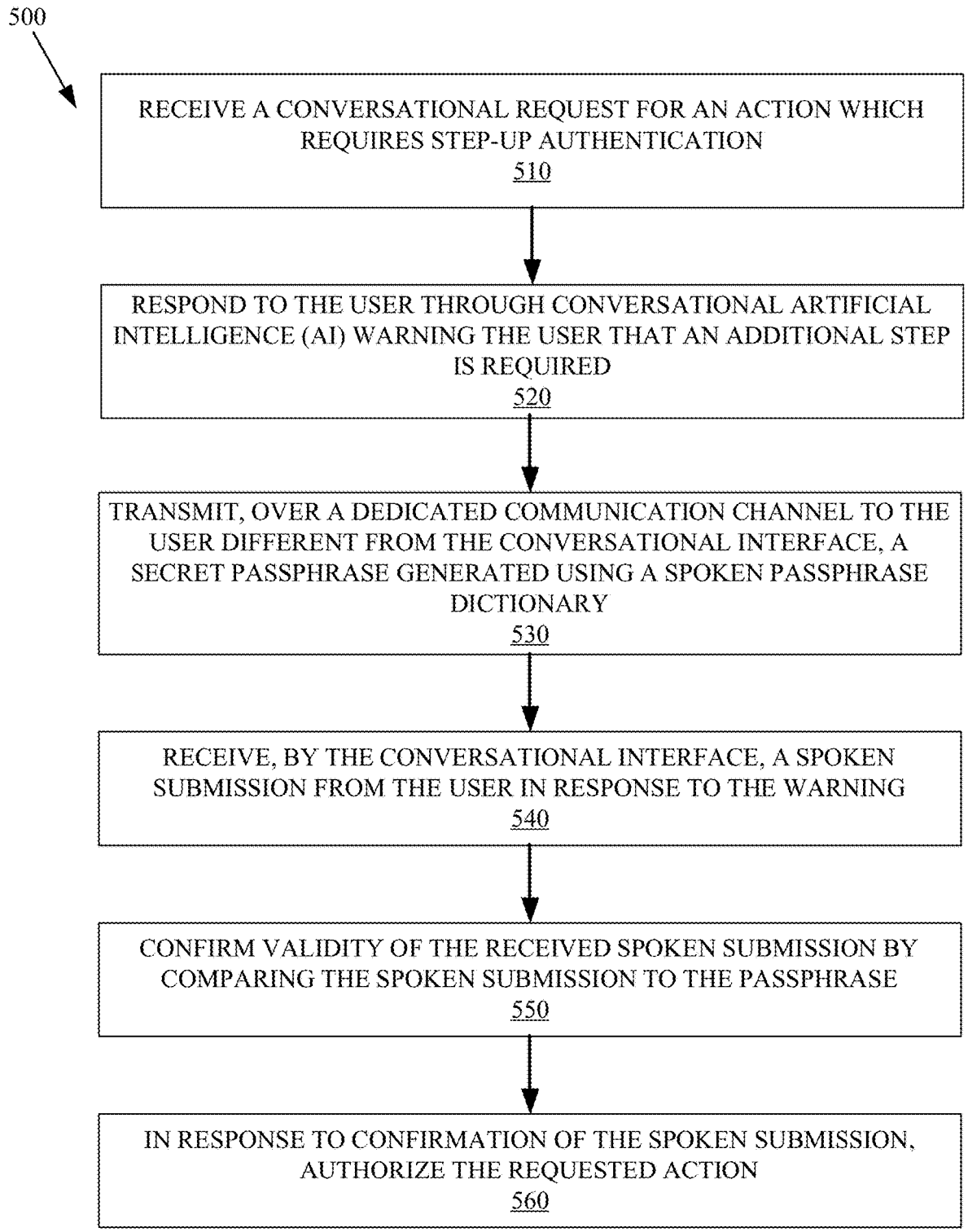
Figure 6:
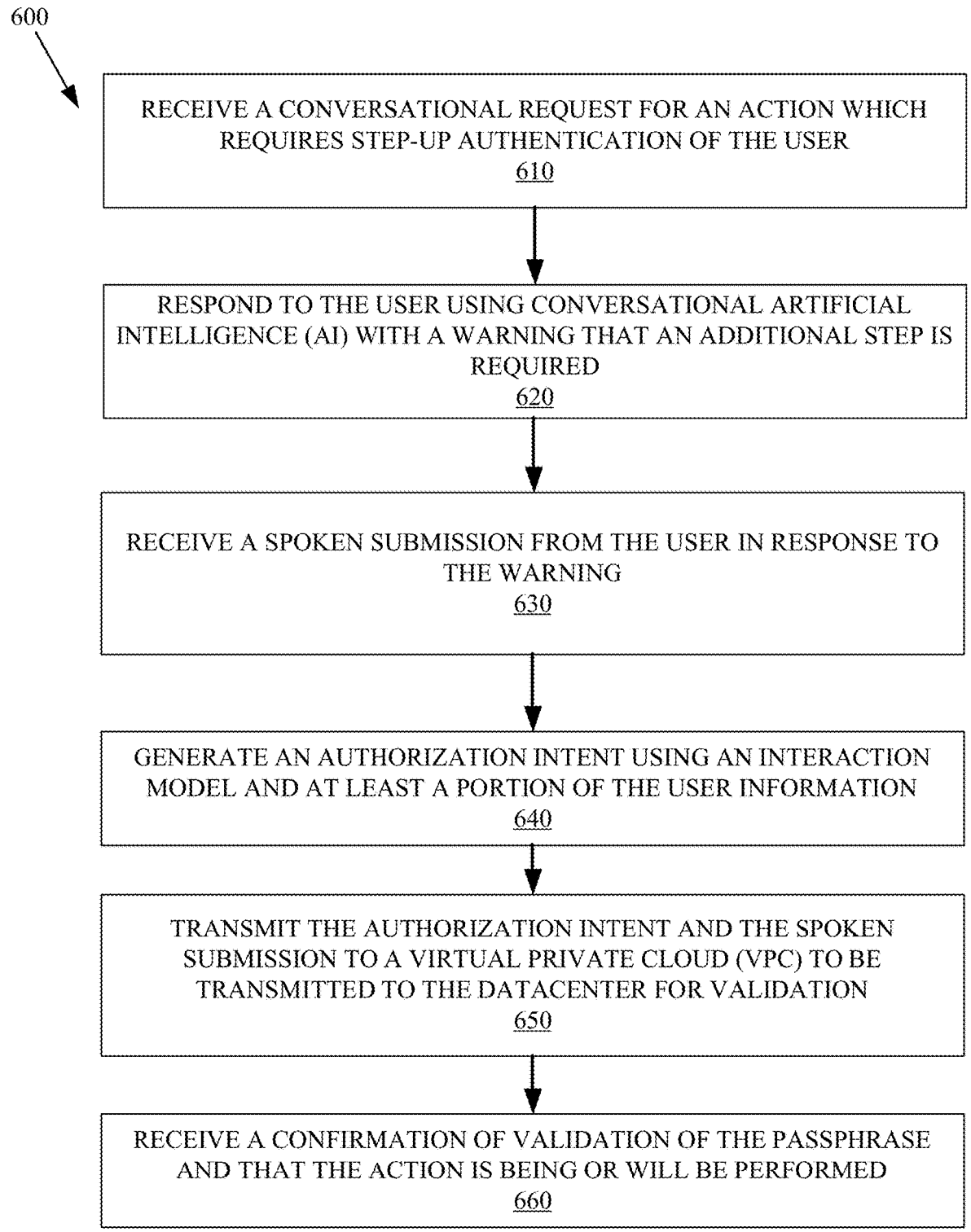

Having thus described embodiments of the invention in general terms, reference will now be made to the accompanying drawings, wherein:

FIG. 1 illustrates an enterprise system and environment thereof for step-up authentication for conversational interfaces in accordance with one embodiment of the present invention;

FIG. 2 illustrates a conversational interface network according to embodiments of the invention;

FIG. 3 illustrates a hypothetical interaction among a user's conversational interface and mobile device according to embodiments of the invention;

FIG. 4 illustrates the NATO phonetic alphabet;

FIG. 5 illustrates a method for step-up authentication for conversational interfaces according to embodiments of the invention; and FIG. 6 illustrates another method for step-up authentication for conversational interfaces according to embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

According to embodiments of the invention, step-up authentication for conversational interfaces is provided. When a user interacts with a conversational interface, there may sometimes be a need to authorize certain interactions. This must be done in a manner such that the conversation can be overheard without compromising the security of the authorization. Not all interactions require additional authorization. In embodiments discussed herein, additional or step-up authentication for authorization of certain interactions such as financial transactions is accomplished by establishing a secret "passphrase" which is generated by computer randomly from a dictionary of easy-to-pronounce and easy to distinguish words. This passphrase is provided via a separate, known channel of communication to the user (e.g. SMS, Email, Push Notification). This means a user must have access to at least two different channels (conversational interface, plus one other) in order to authorize an interaction or command. Authorization can occur asynchronously, meaning a user could request an action, then later that day return and authorize that action using the passphrase. A passphrase can only be used one time, and only for a specified period of time. Once a passphrase has been used or has expired, a user can utter the passphrase, but the conversational interface will not perform any actions as a result.

According to embodiments of the invention, a back-end server system for step-up authentication for conversational interfaces using spoken passphrases receive a conversational request for an action which requires step-up authorization; respond to the user through conversational artificial intelligence (AI) warning the user that an additional step is required; transmit, over a dedicated communication channel to the user and different than the conversational interface, a secret passphrase generated using a spoken passphrase dictionary; receive, by the conversational interface, a spoken submission from the user in response to the warning; confirm validity of the received spoken submission by comparing the spoken submission to the passphrase; and in response to confirmation of the spoken submission, authorize the requested action.

According to embodiments of the invention, a conversational interface for step-up authentication using spoken passphrases receives a conversational request for an action which requires step-up authentication; responds to the user using conversational artificial intelligence (AI) with a warning that an additional step is required; wherein a passphrase service of a datacenter transmits, over a communication channel separate from the conversational interface and to the user, a secret passphrase generated using a spoken passphrase dictionary; receives a spoken submission from the user in response to the warning; generates an authorization intent using an interaction model; transmits the authorization intent and the spoken submission to a virtual private cloud (VPC), wherein the authorization intent and spoken submission is transmitted to the datacenter using one or more application programming interfaces (APIs) for validation of the spoken passphrase; wherein the passphrase service of the datacenter confirms validity of the received spoken submission by comparing the spoken submission to the passphrase; and in response to confirmation of the spoken submission, authenticates the user, thereby authorizing the requested action; and receives a confirmation of validation of the passphrase and that the action is being or will be performed.

According to embodiments of the invention, a system for step-up authentication using a spoken passphrase includes a conversational interface to: receive a conversational request for an action which requires step-up authorization; respond to the user through conversational artificial intelligence (AI) warning the user that an additional step is required; and a user mobile device to: receive, over a communication channel between a datacenter and the mobile device, to the user and different than the conversational interface, a secret passphrase generated using a spoken passphrase dictionary; wherein the conversational interface is further to receive a spoken submission from the user in response to the warning; wherein the datacenter confirms validity of the received spoken submission by comparing the spoken submission to the passphrase; and wherein the conversational interface is further to, in response to confirmation of the spoken submission, authorize the requested action.

Referring to FIG. 2, a diagram of a conversational interaction network system 270 is shown. A user 272 interacts with a conversational interface 274 that may be loaded with an entity interaction model 276. A standard industry term for functions for digital assistants and chatbots is an "intent". An intent is an intersection of what the user inputs into a device and what the machine learning (ML) model decides the user intended to execute. A conversational interface 274 triggers, for example, a weather "intent" when a user asks what the weather is like outside. The entity interaction model 276 is a collection of intents created by the entity and configured for interacting with the cloud 282. The cloud 282 provider enables the entity to pass an arbitrary search phrase. An intent is defined about authorization and accepts a search phrase of several words. The search phrase of several words and the authorization intent are passed from the entity interaction model 276 to the cloud 282.

The entity lambda trigger 278 interacts with the virtual private cloud (VPC) 280 for the entity. A VPC is the logical division of a service provider's public cloud multi-tenant architecture to support private cloud computing. The entity VPC 280 provides access to the entity's application programming interfaces (APIs) configured for accessing the entity's own systems.

The entity APIs are linked to and provide access to the entity datacenter 284, which may be housed on entity back-end server systems, cloud system, other systems or a combination of systems. The entity datacenter 284 may include an entity conversational server 286, which has access to stored private information associated with customers of the entity, such as an entity deposit system 288.

The entity conversational service 286 also has access to an entity passphrase service 290 which leverages a passphrase database 292 housing the spoken passphrase dictionary. The entity passphrase service 290 is operatively coupled with a second device 294 (other than the conversational interface 274 device) owned by the user 272. The system communicates the spoken passphrase to the user 272 through the second device 294, which is done over a second, potentially dedicated, but in any event distinct communication channel established between the user's second device 294 and the entity passphrase service 290 of the entity datacenter 284.

In various embodiments, the use of multiple channels for delivery of the passphrase to the user and submission of the passphrase for validation enables the possibility for asynchronous authentication. This is because the level of security is improved given two or more channels for delivery and submission, and so the need for a quickly expiring passphrase is reduced.

Referring now to FIG. 3, a diagram illustrates a hypothetical interaction 300 among a conversational interface, a user, and a mobile device. In exchange 302, a user issues a spoken command to a conversational interface, asserting "Transfer $100 from checking to savings". The conversational interface replies "Got it, you want me to Transfer $100 from your checking account to your savings account. I'll text you with one more step to complete this transaction." The conversational interface has authenticated its owner, which is assumed to be the user who has spoken the command. The conversational interface sends an intent through the cloud to the datacenter, which generates a spoken passphrase from the passphrase database and transmits the passphrase to the conversational interface owner's mobile device, such as by text message.

In exchange 304, the mobile device displays the message received from the datacenter, namely, "To finish your transaction please say Assistant, Authorize: Correct Horse Stapler". In this example, the message is instructing the device's owner to initiate the conversational interface by beginning the command with "Assistant, Authorize" and following with recitation of the passphrase transmitted from the datacenter. In this example, the passphrase is "Correct Horse Stapler".

In exchange 306, the owner states "Assistant, Authorize Correct Horse Stapler", and the conversational interface processes the spoken passphrase by sending it along with an authorization intent as discussed above to the datacenter through the VPC. The datacenter validates the spoken passphrase and communicates confirmation back to the conversational interface, which informs the owner "Thanks, your transaction is authorized!" In the event of a fraudulent attempt by a non-owner of the conversational interface to perform a transaction such as a money transfer, the non-owner would speak a transfer command, and the datacenter would communicate the generated passphrase to the owner's mobile device, of which the non-owner does not have access. Therefore, the non-owner's command could not be authorized with the valid spoken passphrase and the transaction would not be authorized.

Referring now to FIG. 4, a chart illustrating the NATO phonetic alphabet 400 is illustrated. Certain words are easier for a conversational AI to distinguish. For embodiments of the present invention, the passphrase database of words has been selected utilizing the NATO phonetic alphabet and/or additional words meeting certain criteria. Those additional words are selected based on requirements similar to the requirements of the NATO phonetic alphabet. They are deemed to be as "accent proof" as possible. They do not overlap significantly in sound. They come from a "dictionary list" that is long enough to provide significant uniqueness. The list of words in the passphrase database can be retired or added at any time. In certain embodiments, a passphrase is made up of three (3) or more words, designed to be spoken aloud.

Referring to FIG. 5, a flowchart illustrates a method for step-up authentication for conversational interfaces according to embodiments of the invention. The first step, represented by block 510, is to receive a conversational request for an action which requires step-up authentication. The conversational interface receives a request for an interaction that requires a step-up authentication. For example, a user may request a transfer of funds.

The next step, represented by block 520, is to respond to the user through conversational artificial intelligence (AI) warning the user that an additional step is required. The conversational interface leverages a conversational AI that interprets the spoken command and recognizes that the request requires a step-up authentication for authorization. The conversational interface communicates to the user that the additional step will be required in order to achieve authorization.

The next step, represented by block 530, is to transmit, over a communication channel not connected with the conversational interface to the user a secret passphrase generated using a spoken passphrase dictionary. In some embodiments, the additional communication channel is from the datacenter to the mobile device as discussed elsewhere herein.

The command is interpreted and sent through the VPC to the datacenter's APIs for passphrase generation and communication from the datacenter to the additional communication channel, such as to the user's mobile device. The user can read the message and speak the passphrase to the conversational interface to initiate step-up authentication.

The next step, represented by block 540, is to receive, by the conversational interface, a spoken submission from the user in response to the warning. The next step, represented by block 550, is to confirm validity of the received spoken submission by comparing the spoken submission to the passphrase. When the conversational interface receives the submission, it sends an intent along with the submission through the VPC to the datacenter for validation of the submission. Once the submission is validated, the datacenter transmits confirmation of validation and authorization of the command.

The final step, represented by block 560, is in response to confirmation of the spoken submission, to authorize the requested action. In some embodiments, the conversational interface authorizes the requested action, and in other embodiments, the datacenter itself or other component of the system, authorizes the requested action in response and in light of validation of the passphrase.

Referring now to FIG. 6, a flowchart illustrates another method 600 for step-up authentication for conversational interfaces. The first step, represented by block 610, is to receive a conversational request for an action which requires step-up authentication of the user. The next step, represented by block 620, is to respond to the user using conversational AI with a warning that an additional step is required. The next step, represented by block 630, is to receive a spoken submission from the user in response to the warning. The next step, represented by block 640, is to generate an authorization intent using an interaction model and at least a portion of the user information, such as for example, the submission for validation.

The next step, represented by block 650, is to transmit the authorization intent and the spoken submission to a virtual private cloud (VPC) to be transmitted to the datacenter for validation, which may be done by using the API(s) of the datacenter. The datacenter validates the submission if it matches the generated passphrase and sends communication to the conversational interface of the validation. The final step, represented by block 660, is to receive a confirmation of validation of the passphrase and that the action is being or will be performed.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A conversational interface system for step-up authentication using spoken passphrases, the system comprising:
   at least one processor;
   a communication interface communicatively coupled to the at least one processor; and
   a memory device storing executable code that, when executed, causes the processor to:
      receive a conversational request from a user for an action, and based thereon derive an intent by comparing, using a conversational interface, the intent to a collection of intents stored by an interaction model, the deriving determining the intent requires step-up authentication;
      based on the determination, initiate a step-up authentication process that includes responding to the user using conversational artificial intelligence (AI) with a warning that an additional authentication step is required, the additional authentication step including an interaction with a virtual private cloud;
   wherein a passphrase service of a datacenter transmits, over a communication channel separate from the conversational interface and to the user, a secret passphrase generated using a spoken passphrase dictionary;
      receive a spoken submission from the user in response to the warning and based thereon determine a spoken intent of the spoken submission is to initiate an interaction with the virtual private cloud;
      generate an authorization intent using an interaction model;
      transmit the authorization intent and the spoken submission to the virtual private cloud (VPC), wherein the authorization intent and spoken submission is transmitted to the datacenter using one or more application programming interfaces (APIs) for validation of the spoken passphrase;
   wherein the passphrase service of the datacenter confirms validity of the received spoken submission by comparing the spoken submission to the passphrase; and in response to confirmation of the spoken submission, authenticates the user, thereby authorizing the requested action; and
   receive a confirmation of validation of the passphrase and that the action is being or will be performed.

2. The conversational interface of claim 1, wherein the passphrase service of the datacenter accesses a spoken passphrase dictionary of words; and generates the secret passphrase by randomly selecting a plurality of words from the spoken passphrase dictionary.

3. The conversational interface of claim 1, wherein transmission by the passphrase service of the datacenter of the secret passphrase over the communication channel separate from the conversational interface and receiving of the spoken submission occur asynchronously.

4. The conversational interface of claim 3, wherein asynchronous occurrence refers to up to one hour of time passing between transmission and receiving.

5. The conversational interface of claim 1, wherein the communication channel is configured to communicate using at least one selected from the group consisting of SMS, text, email, and app push notification.

6. The conversational interface of claim 1, wherein the passphrase is a one-use passphrase that will be invalid if used more than once.

7. The conversational interface of claim 1, wherein the passphrase expires a predetermined period of time after its transmission to the user.

8. The conversational interface of claim 1, wherein the spoken passphrase dictionary words are subject to removal from the dictionary in the event they are identified as causing confusion with other words.

9. The conversational interface of claim 1, wherein the passphrase comprises at least three words randomly selected from the spoken passphrase dictionary.

10. A method for step-up authentication for using spoken passphrases, the method performed by a conversational interface and comprising:
   receiving a conversational request from a user for an action, and based therein deriving an intent by comparing, using a conversational interface, the intent to a collection of intents stored by an interaction model, the deriving determining the intent requires step-up authentication;
   based on the determination, initiate a step-up authentication process that includes responding to the user using conversational artificial intelligence (AI) with a warning that an additional step is required, the additional authentication step including an interaction with a virtual private cloud;
   wherein a passphrase service of a datacenter transmits, over a communication channel separate from the conversational interface and to the user, a secret passphrase generated using a spoken passphrase dictionary;
   receiving a spoken submission from the user in response to the warning and based thereon determine a spoken intent of the spoken submission is to initiate an interaction with the virtual private cloud;
   generating an authorization intent using an interaction model;

transmitting the authorization intent and the spoken submission to the virtual private cloud (VPC), wherein the authorization intent and spoken submission is transmitted to the datacenter using one or more datacenter application programming interfaces (APIs) for validation of the spoken passphrase;

wherein the passphrase service of the datacenter confirms validity of the received spoken submission by comparing the spoken submission to the passphrase; and in response to confirmation of the spoken submission, authenticates the user, thereby authorizing the requested action; and receiving a confirmation of validation of the passphrase and that the action is being or will be performed.

11. The method of claim 10, wherein the passphrase service of the datacenter accesses a spoken passphrase dictionary of words; and generates the secret passphrase by randomly selecting a plurality of words from the spoken passphrase dictionary.

12. The method of claim 10, wherein transmission by the passphrase service of the datacenter of the secret passphrase over the communication channel separate from the conversational interface and receiving of the spoken submission occur asynchronously.

13. The method of claim 12, wherein asynchronous occurrence refers to up to one hour of time passing between transmission and receiving.

14. The method of claim 10, wherein the communication channel is configured to communicate using at least one selected from the group consisting of SMS, text, email, and app push notification.

15. The method of claim 10, wherein the passphrase is a one-use passphrase that will be invalid if used more than once.

16. The method of claim 10, wherein the passphrase expires a predetermined period of time after its transmission to the user.

17. A conversational interface system for step-up authentication using spoken passphrases, the system comprising:
at least one processor;
a communication interface communicatively coupled to the at least one processor; and
a memory device storing executable code that, when executed, causes the processor to:
receive a conversational request from a user for an action, and based thereon derive an intent by comparing, using a conversational interface, the intent to a collection of intents stored by an interaction model, the deriving determining the which requires step-up authentication of the user;
based on the determination, initiate a step-up authentication process that includes responding to a user using conversational artificial intelligence (AI) with a warning that an additional step is required, the additional authentication step including an interaction with a virtual private cloud;
wherein a passphrase service of a datacenter transmits, over a communication channel separate from the conversational interface and to the user, a secret passphrase generated using a spoken passphrase dictionary;
receive a spoken submission from the user in response to the warning and based thereon determine a spoken intent of the spoken submission is to initiate an interaction with the virtual private cloud;
wherein the user has been validated using basic authentication to the conversational interface, which stores user information in the memory device;
generate an authorization intent using an interaction model and at least a portion of the user information;
transmit the authorization intent and the spoken submission to the virtual private cloud (VPC), wherein the authorization intent and spoken submission is transmitted to the datacenter using one or more datacenter application programming interfaces (APIs) for validation of the spoken passphrase;
wherein the passphrase service of the datacenter confirms validity of the received spoken submission by comparing the spoken submission to the passphrase; and in response to confirmation of the spoken submission, authenticates the user, thereby authorizing requested action; and
receive a confirmation of validation of the passphrase and that the action is being or will be performed.

* * * * *

UNITED STATES PATENT AND TRADEMARK OFFICE
CERTIFICATE OF CORRECTION

| | | |
|---|---|---|
| PATENT NO. | : 12,267,431 B2 | Page 1 of 1 |
| APPLICATION NO. | : 17/662941 | |
| DATED | : April 1, 2025 | |
| INVENTOR(S) | : Peter Eric Sutherland, Laurence Henry Lipsmeyer and Nelson Joseph Erb | |

It is certified that error appears in the above-identified patent and that said Letters Patent is hereby corrected as shown below:

In the Claims

Claim 17, Column 20, Line 7, should read --the deriving determining the intent requires step-up--

Signed and Sealed this
Tenth Day of June, 2025

Coke Morgan Stewart
*Acting Director of the United States Patent and Trademark Office*